July 6, 1948.	G. W. MARKS ET AL	2,444,457
METAL LENS HOLDER
Filed July 7, 1947
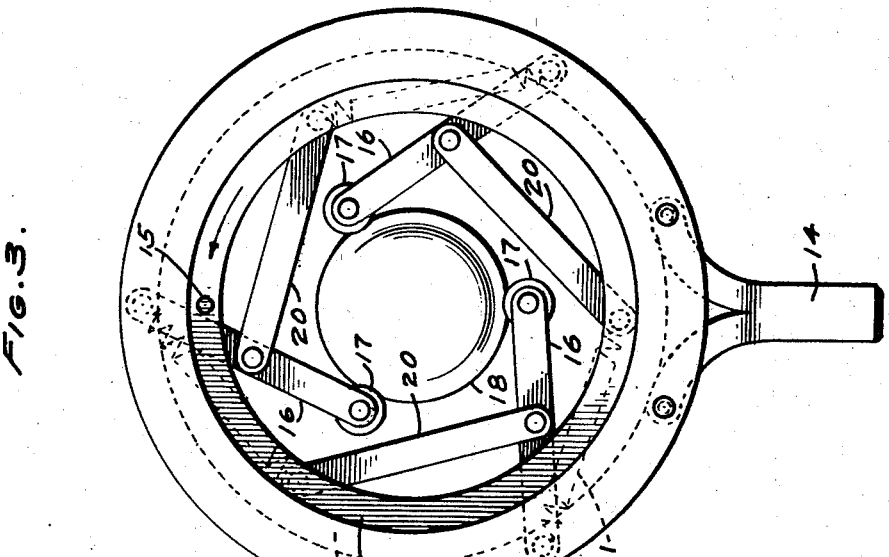
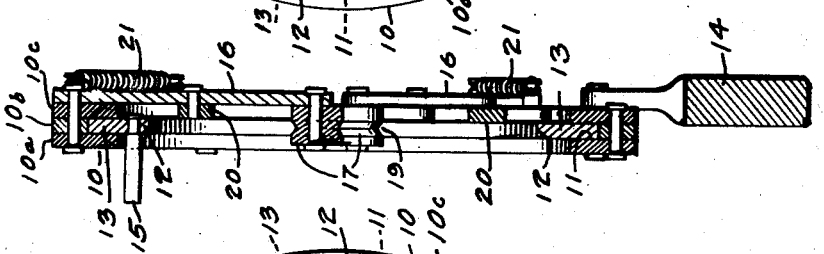
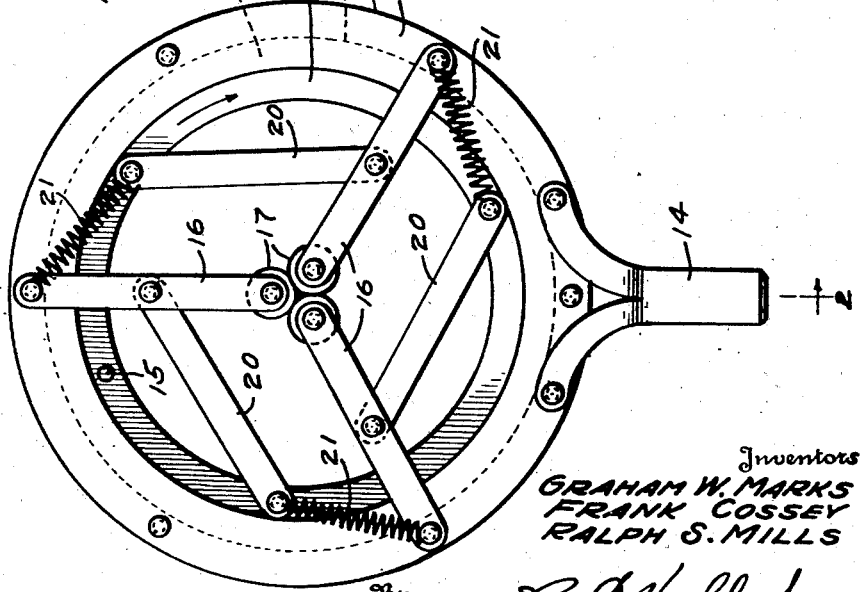
Inventors
GRAHAM W. MARKS
FRANK COSSEY
RALPH S. MILLS
By Roy A. Hackley Jr.
Attorney Patented July 6, 1948

2,444,457

UNITED STATES PATENT OFFICE 2,444,457

METAL LENS HOLDER

Graham W. Marks, Frank Cossey, and Ralph S. Mills, Salt Lake City, Utah, assignors to the United States of America as represented by the Secretary of Interior Application July 7, 1947, Serial No. 759,460

1 Claim. (Cl. 88—57)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (Ch. 460, 45 Stat. L. 467).

This invention relates to holders for optical elements, and more specifically to means for temporarily mounting a lens, relatively thin prism, a filter, mirror, and the like.

An object of the invention is to provide a holder whereby an optical element may be readily and securely held unobstructed along its axis of collimation or lines of reflection for example, for test in order to determine the focal length or the performance of the optical piece for the classification thereof prior to permanently mounting the same.

Another object is to provide a holder whereby optical elements may be readily exchanged for comparison, teaching and for temporary use.

A still further object is to provide means for applying non-destructive, equalized and offset pressures to a plurality of points at the edges of an optical element for holding the same temporarily.

A further object of the invention is to provide a holder whereby an optical element may be inserted or removed without disturbing the focal length setting of the holder with respect to a fixed object or lettering used for testing the piece.

These and other objects of the invention will be apparent from a reading of the following description, wherein reference is made to the accompanying drawings illustrative of an embodiment of the invention and in which—

Figure 1 is a rear elevational view of the holder in inoperative position;

Figure 2, a cross-sectional view taken at line 2—2 of Figure 1; and

Figure 3, a front view, in elevation, of the holder illustrating a lens held for inspection or temporary use.

Broadly, the invention comprises a plurality of optical element-engaging means, at least one of which is adjustable, carried by a frame, and releasable impelling means normally urging at least one of the adjustable engaging means toward another of the engaging means whereby to impinge and hold the optical element.

A more limited form of the invention comprises a plurality of adjustable coacting optical element engaging means carried by a frame, impelling means normally urging the respective engaging means one toward another, and spreading means for temporarily overcoming the impelling means and separating the engaging means whereby to receive or release an optical piece.

As illustrated in the drawings, an operable embodiment of the invention comprises a frame 10 having a track or groove 11 and a second frame-like member 12 having means or a portion 13 thereof extending into the groove of the first frame 10 whereby the frame 12 may be rotated with respect to the frame 10 or vice versa.

As shown in Figure 2, the frame 10 may be formed by laminated or superimposed rings 10a, 10b and 10c. A centrally disposed one of the rings, such as 10b, may have a greater inner diameter and thereby provide the groove 11 into which the outer edge portion 13 of the frame 12 may extend for rotatably mounting the same.

The frame 10 is provided with a suitable handle 14 whereby it may be conveniently held or mounted in a fixed position upon the testing table. Likewise, the frame 12 is provided with suitable means, such as the handle 15, for rotating that frame with respect to its carrying frame 10.

In the embodiment illustrated, the element-engaging means comprises a plurality of arms 16 each pivotally secured at one end thereof to the frame 10 and provided at their free ends with means for engaging the edge of a lens or other optical element. The preferred means for actually engaging the element consists of pulley or spool-like rollers 17 having planar grooves 19 into which edge portions of the lens 18 may extend and be held against lateral displacement.

Means are provided for normally holding or urging the free ends of the arms 16, one toward another, within the area circumscribed by the frames, and also for moving the free ends of the arms away from one another in order to receive or release an optical element engaged between the member 17. The preferred means for moving the rollers 17 to and from one another comprises a plurality of levers 20 each pivotally secured at one end to the frame 12, and likewise each pivotally secured at its other end to an intermediate point on the arms 16, respectively. By this arrangement, a rotation of the frame 12 (clockwise when viewed from the back of the holder as shown in Figure 1, or counterclockwise when viewed from the front as in Figure 3) with respect to frame 10 will cause the arms 16 to be moved outward by levers 20 and thereby bring about a simultaneous separation of the engaging means 17.

Means causing the free ends of the arms 16 to be urged toward one another and thereby impinge the optical piece between the rollers, may consist of a simple spring arrangement. As shown, coil springs 21 extend from frame 10 to frame 12 in a manner tending to rotate one frame with respect to the other in a direction whereby the levers 20 cause a concomitant movement of the free ends of the arms 16 toward one another and against spaced or opposed points on the edges of a lens inserted between the rollers. In other words, the springs tend to rotate frame 12 in the reverse direction from that necessary to expand the space between the rollers 17.

For operation, the holder is mounted upon a table or held by handle 14; the frame 12 is rotated by the counterclockwise (Figure 3) pull on handle 15, the lens held in edgewise alignment with the grooves 19 of the rollers 17, and thence by gently releasing the pull on handle 15 the springs bring the rollers into engagement with the lens where it is held in an unobstructed position.

Having described our invention and illustrated an embodiment thereof, we claim as our invention:

A holder for temporarily mounting an optical element comprising a pair of concentrically mounted frames, a plurality of arms pivoted to one of said frames and having means at their free ends adapted to engage edge portions of an optical element, a plurality of levers pivotally connected at one end to the other of said frames, means pivotally connecting the free ends of said levers to intermediate points of said arms whereby the rotation of one frame with respect to the other in one direction will cause said element engaging means to move convergingly toward one another for impingement upon an optical element, impelling means normally urging said directional rotation of the frames, means for reversely rotating said frames against the tendency of said impelling means whereby an optical element may be inserted or released.

GRAHAM W. MARKS.
RALPH S. MILLS.
FRANK COSSEY.

REFERENCES CITED

The following references are of record in the file of this patent:

UNITED STATES PATENTS

| Number | Name | Date |
|---|---|---|
| 471,675 | Low et al. | Mar. 29, 1892 |
| 996,017 | Haynes | June 20, 1911 |
| 1,134,938 | Bader et al. | Apr. 6, 1915 |
| 1,272,668 | Jahn | July 16, 1918 |
| 1,622,776 | Fisher | Mar. 29, 1927 |
| 1,873,249 | Allen | Aug. 23, 1932 |
| 1,931,477 | Allen | Oct. 24, 1933 |